July 14, 1959 F. E. ULLMAN ET AL 2,894,361
PROCESS AND APPARATUS FOR APPLYING COVERS TO CONTAINERS
Filed April 15, 1955 8 Sheets-Sheet 1
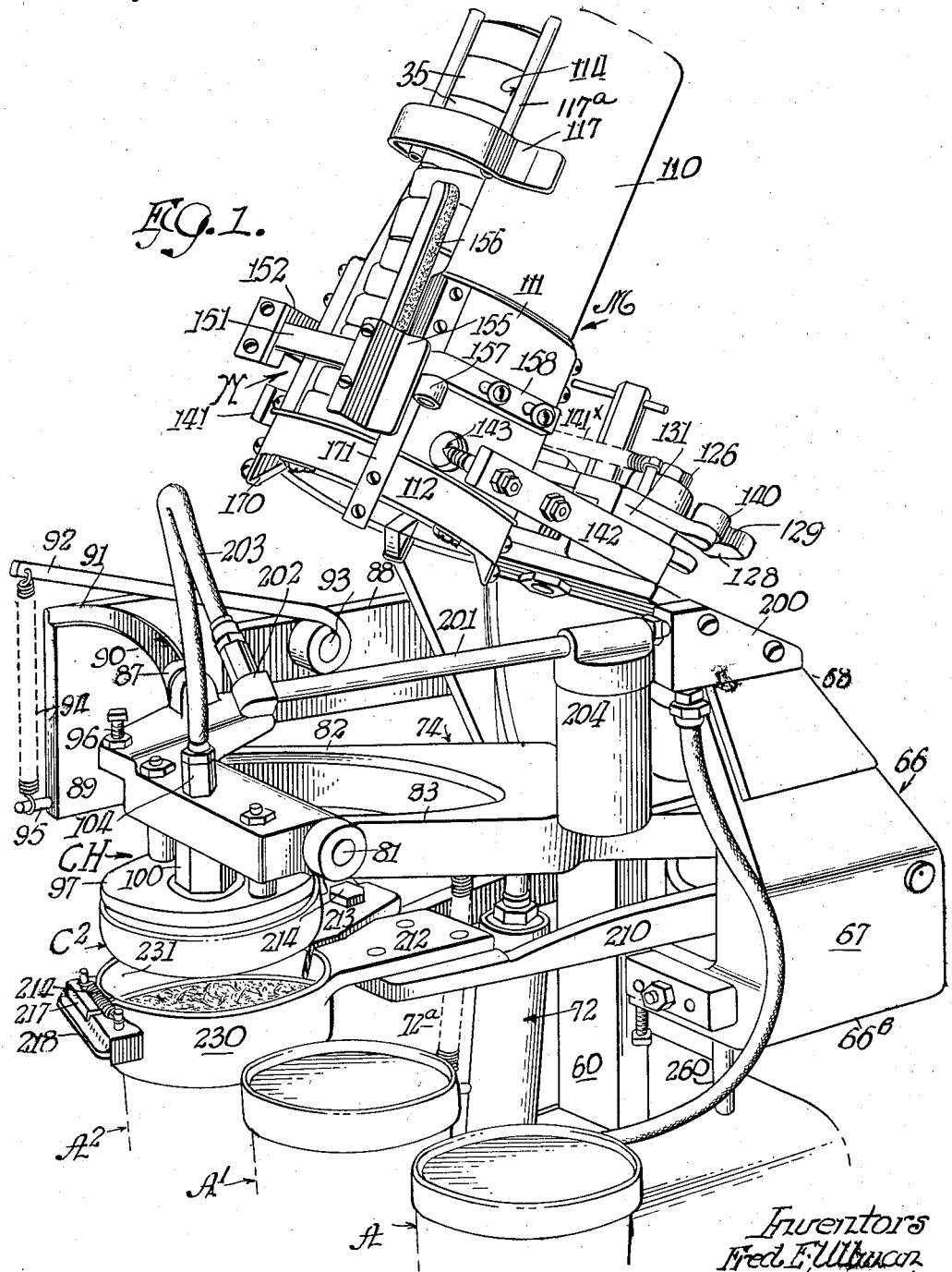

July 14, 1959  F. E. ULLMAN ET AL  2,894,361
PROCESS AND APPARATUS FOR APPLYING COVERS TO CONTAINERS
Filed April 15, 1955  8 Sheets-Sheet 2
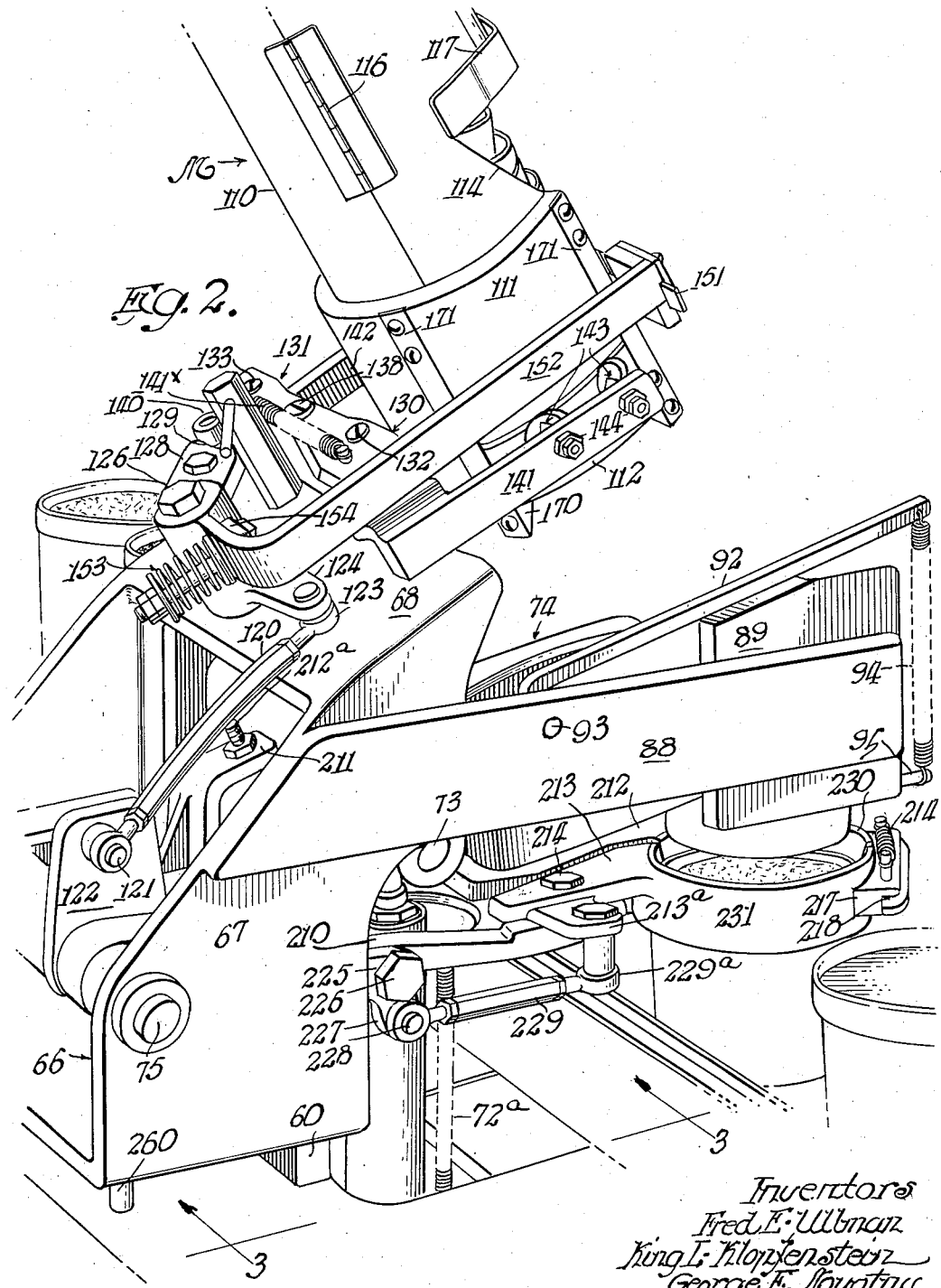

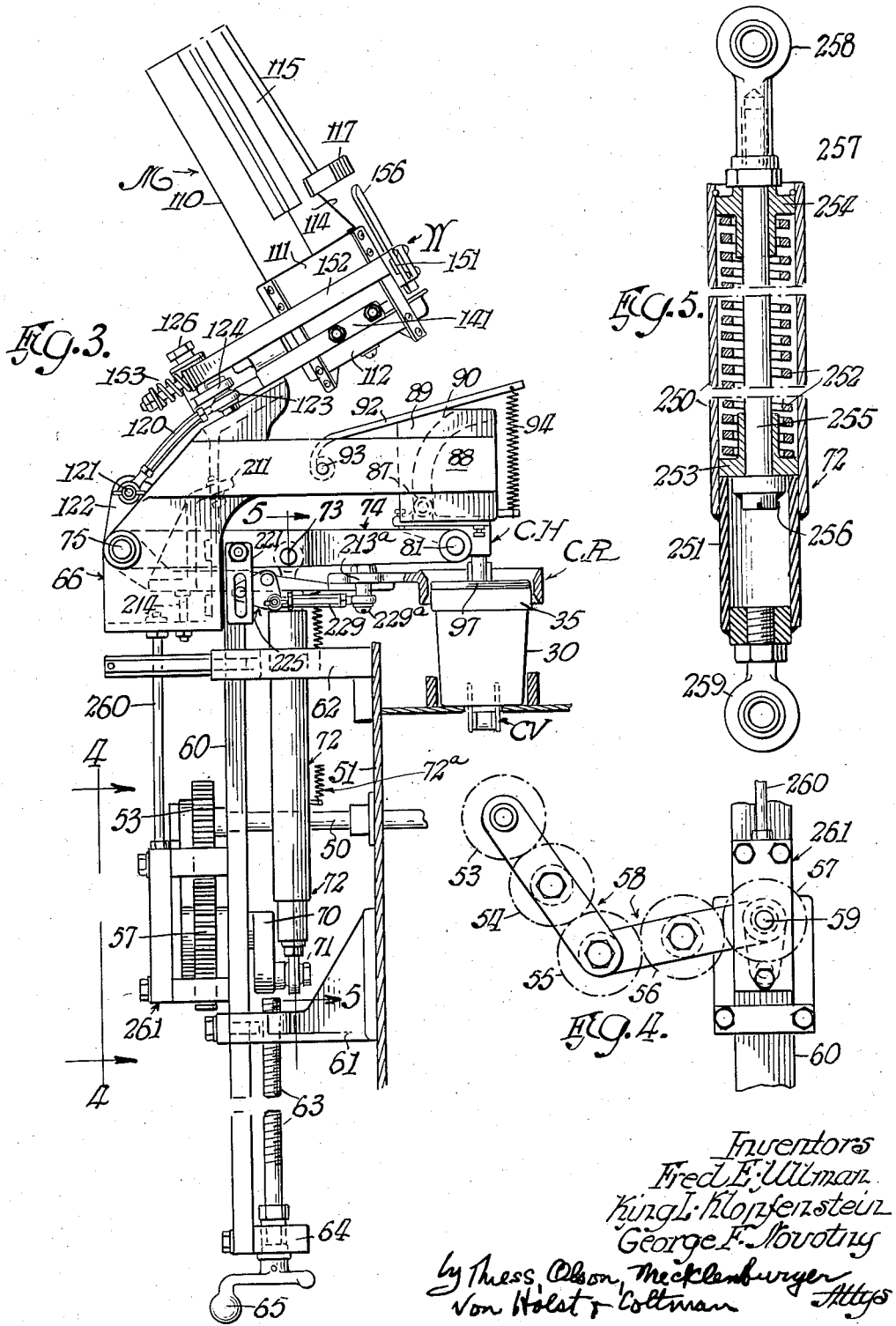

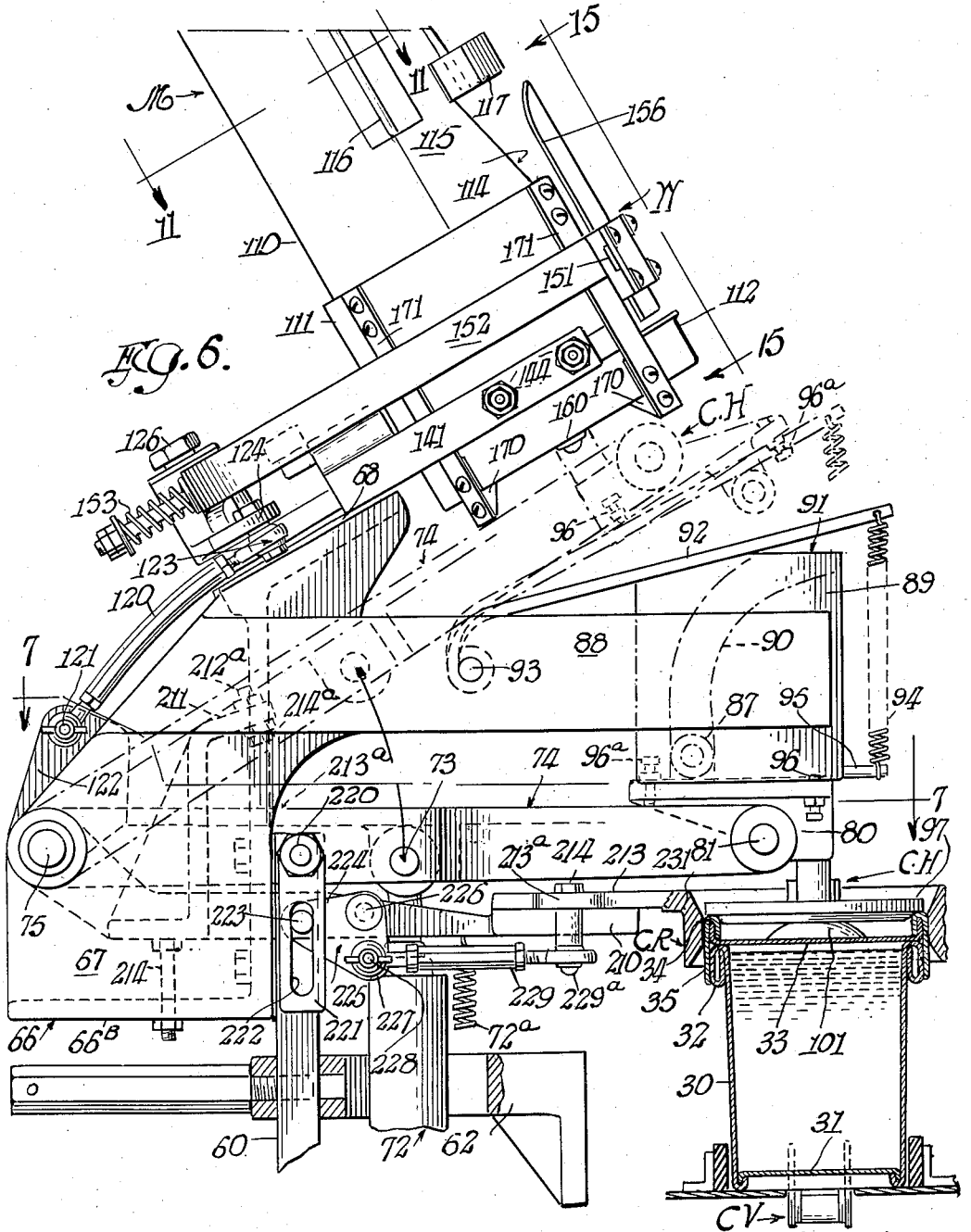

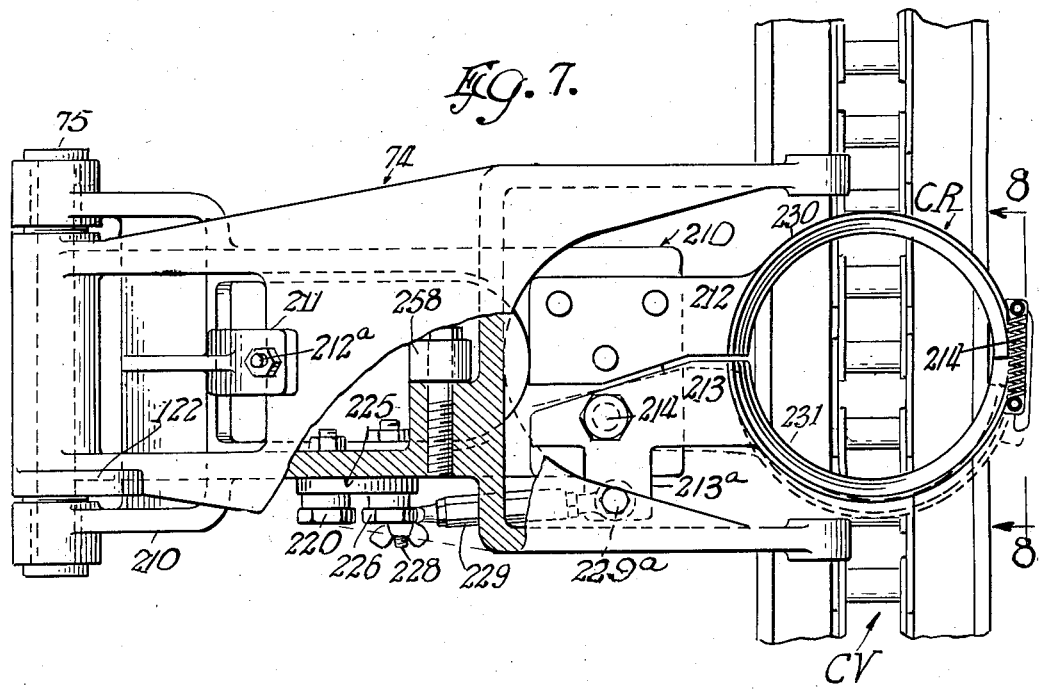
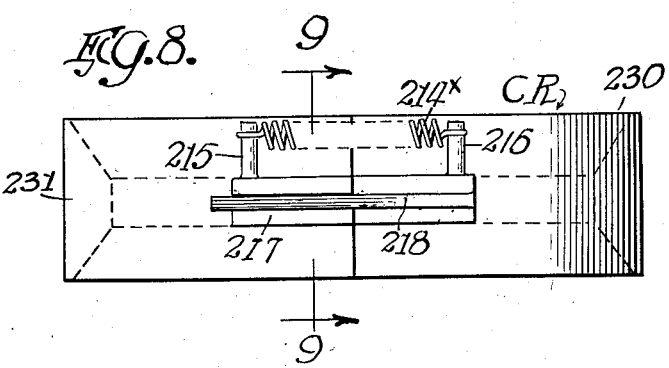
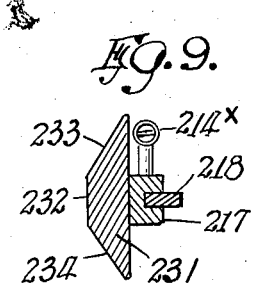
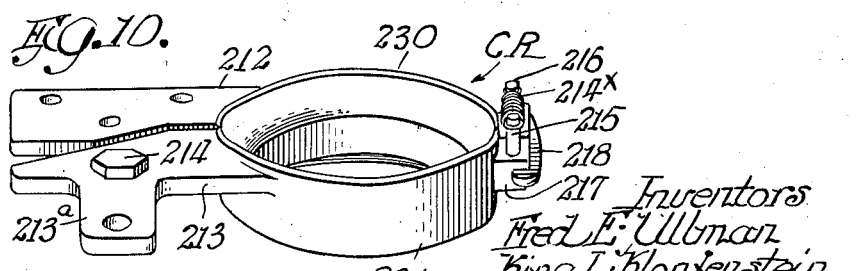

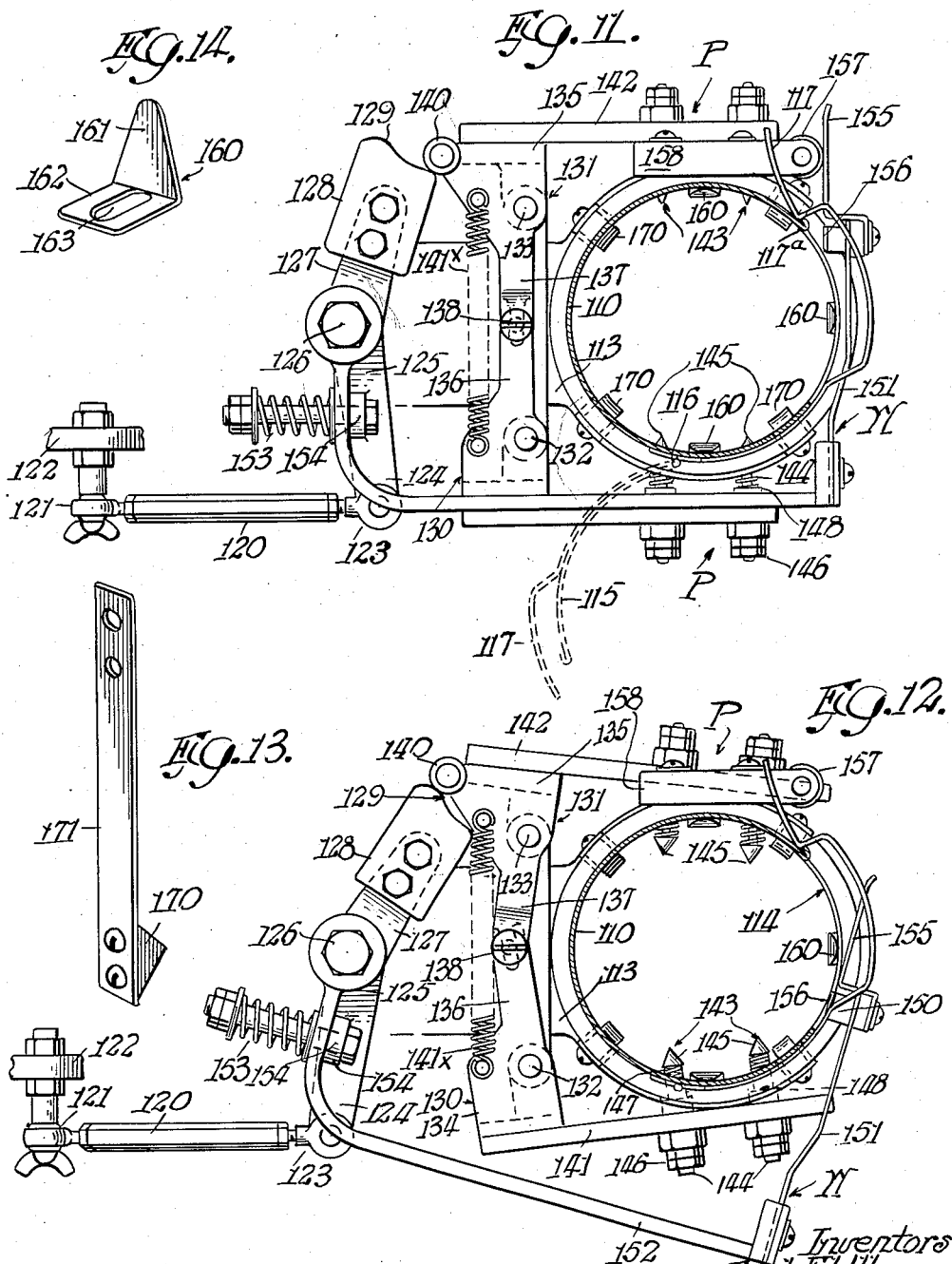

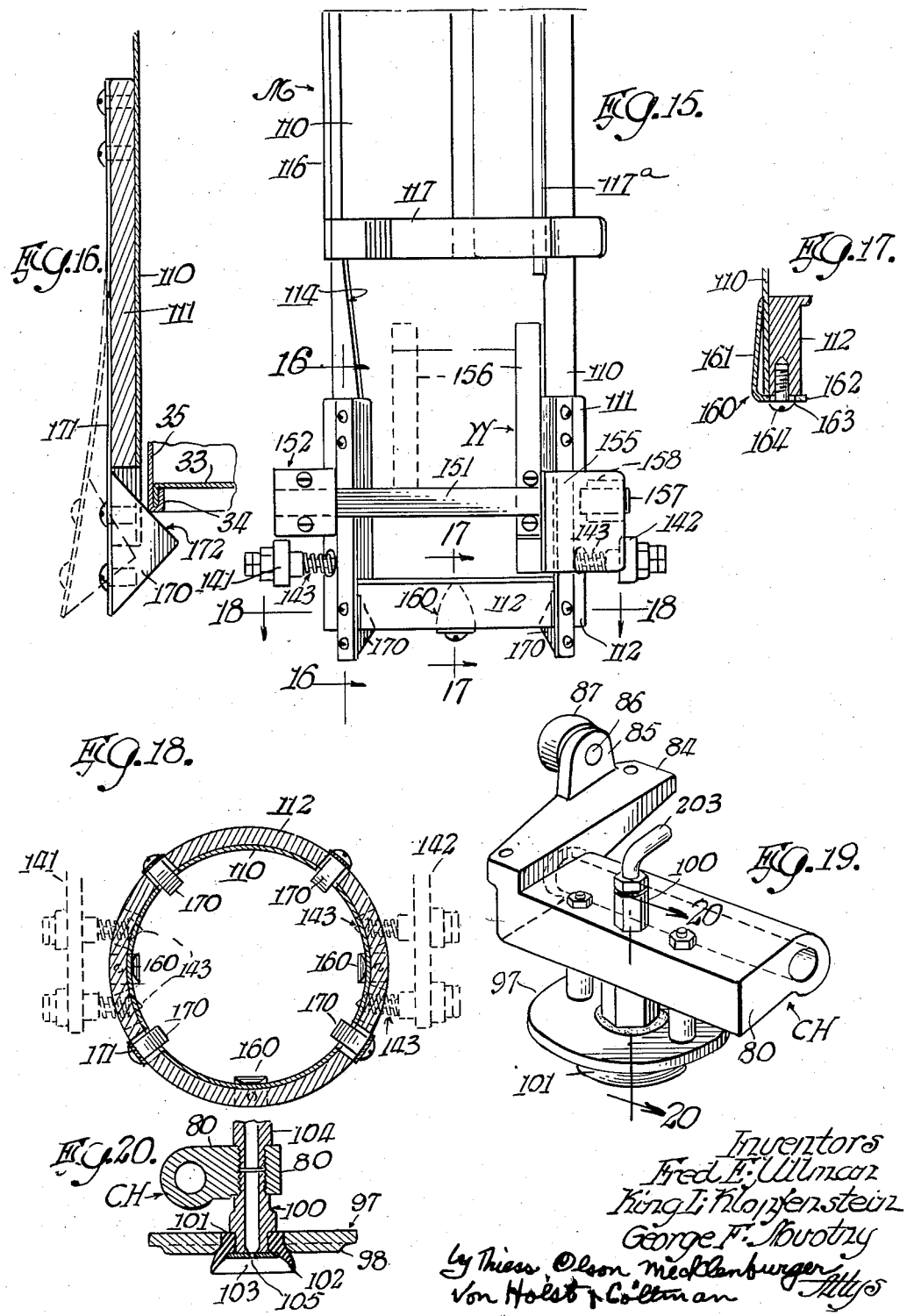

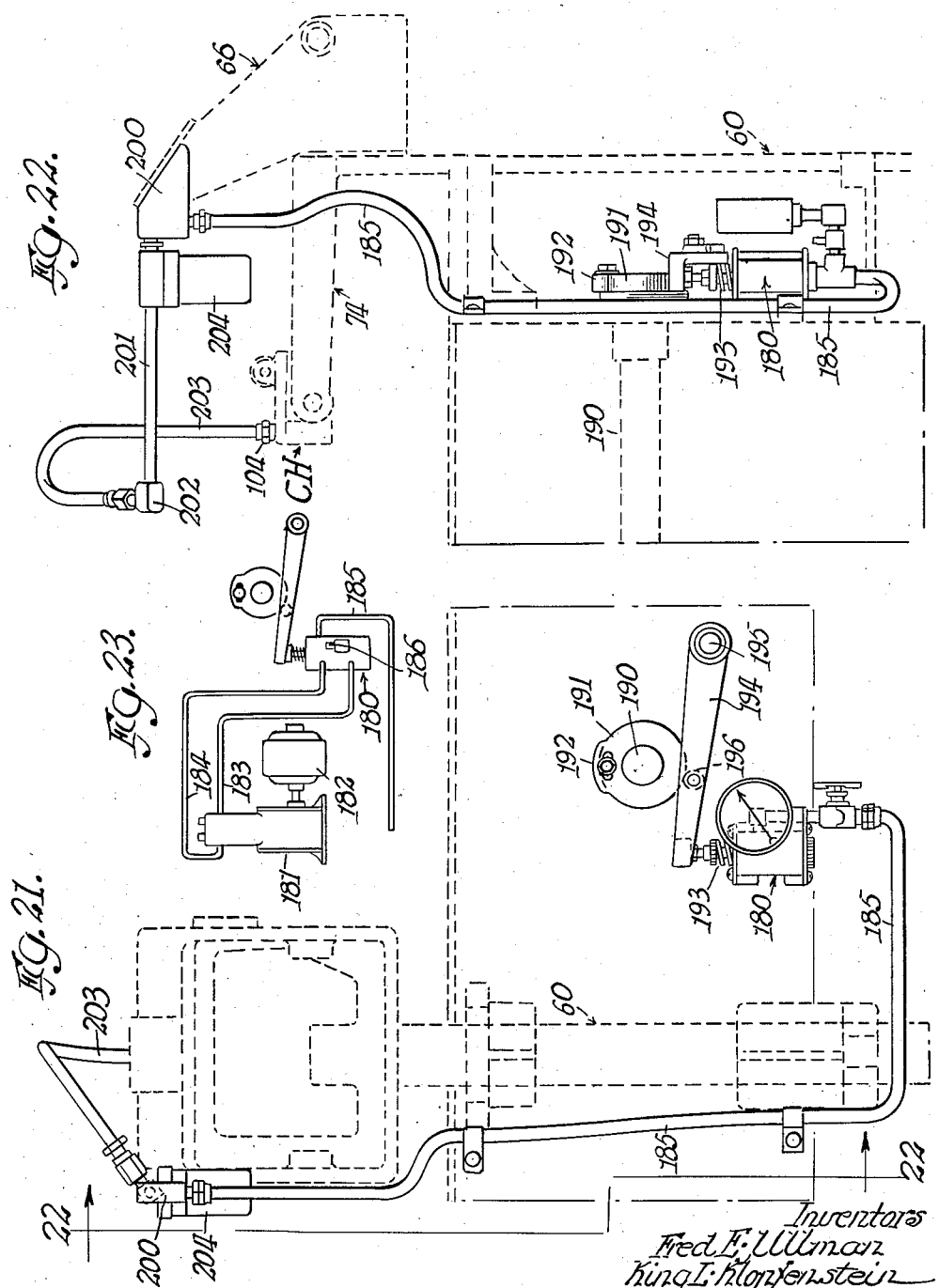

United States Patent Office 2,894,361
Patented July 14, 1959

2,894,361

PROCESS AND APPARATUS FOR APPLYING COVERS TO CONTAINERS

Fred E. Ullman, Winnetka, King L. Klopfenstein, Arlington Heights, and George F. Novotny, Chicago, Ill., assignors to Triangle Package Machinery Company, Chicago, Ill., a corporation of Illinois Application April 15, 1955, Serial No. 501,658

6 Claims. (Cl. 53—40)

The invention relates generally to a process of and apparatus for applying covers to cups or containers, but relates more particularly to processes and apparatus for use in effecting the application of covers to containers of the type of which a paper stock container is a specific example.

Containers of this type are used extensively for packaging a great variety of products. Some of the products are edible, of a liquid or semiliquid order, such for example as cottage cheese, dressings, sauces of various types, ice cream, etc. In order to provide a commercially practicable container it is necessary that the cost be low and that the container be one which can be filled and capped rapidly.

The foregoing and other factors require that the sheet material be of relatively light-weight stock in order to be able to provide a container of such low cost as to be expendable after a single use. The container bodies and covers, therefore, must also be of relatively simple form in order that they can be fabricated rapidly and cheaply. These factors result in a container which is of a relatively flexible or yielding construction. Hence during the normal fabricating and handling operations, some thereof are likely to arrive at the position where the cover is to be applied (capping station) in a condition somewhat different from the intended symmetrical or other intended form. This factor complicates the operation of applying the cap or cover which has been designed to be applied to a container having a definite predetermined shape or configuration.

In the normal operation of applying covers to the containers it is common practice to provide a stack of covers, from which they are successively removed for application to the successive containers as the containers reach the capping station. Here again trouble has been encountered because of the tendency of the covers in the stack to "nest" irregularly. That is to say, they become "canted" or "crocked" in such manner as to make difficult separation of the covers for application to the containers, as required in the capping operation.

As in the case of the body of the container, the covers are also of relatively light-weight sheet material. Hence, in the handling and manipulating operations, some thereof are likely to become deformed. However, in order that they may all be applied quickly and properly to the containers, it is required that they be in the intended proper shape at the time the cover is applied to the container.

The foregoing are but some of the problems presented in connection with the "capping" of containers of the type, to which this invention relates. However, from the foregoing remarks, it can be seen that many problems are presented. There are conflicting requirements which must be harmonized. Commercial requirements dictate that the sheet material be of light-weight stock and yet this, in turn, makes for instability in the shape of the fabricated container, and in the likelihood that at least same may, in handling, become deformed prior to their arrival at the capping station.

High speed operations are also a prime necessity, yet operation at high speed is also a factor that tends to create the likelihood some of the container bodies and/or covers will be somewhat deformed by the time they arrive at the capping station which, in turn, unless corrected, can result in failure properly to complete the capping operation.

High speed operation also makes more critical the synchronization of the container body and cover parts so that each will be in exactly the right position, at exactly the right time, i.e. when the cover and container are to be united in what is sometimes termed the capping operation.

The general object of the invention is to provide an improved process and apparatus for applying covers to containers.

Another object of the invention is to provide a process and apparatus whereby a larger number of containers can be capped per unit of time.

Again, it is an object of the invention to provide a process and apparatus wherein deformation of the cover and/or container body will be corrected at the capping station, thereby enabling the capping operation to be properly completed.

A further object of the invention is to provide a process and apparatus wherewith alignment of the container and cover at the capping station will be assured, thereby preventing danger of damage to the container and/or cover and making possible the rapid and proper application of the cap or cover to the container body.

A still further object of the invention is to provide a process and apparatus whereby a stack of covers or caps can be denested so that one thereof can be removed from the stack, as required, for a capping operation.

Again, it is an object of the invention to provide a process and apparatus wherein a vacuum is used as a part of the operation of removing a cover from a stack and in moving it toward capping position and wherein air pressure is employed to facilitate the release of the cover at the point of application to the container.

A further object of the invention is to provide a process and apparatus wherein a reversible system of applied vacuum at one point of the operation and air pressure at another are utilized and in which means are provided making possible the reestablishment of a partial vacuum in the line during the interval between the use of the applied air pressure, as when the cover is being applied to a container and the time when cover-removing means again reaches the position for engagement with and removal of another cover from a stack of covers in a succeeding operation.

The above named objects of the invention, as well as others, will more fully appear as the specification proceeds to describe a preferred embodiment of the invention, as illustrated in the drawings.

In the drawings:

Fig. 1 is a perspective view of the capping head of a cover applying machine, as looked at from one side and one end of the head.

Fig. 2 is another perspective view of the capping head of Fig. 1, as looked at from the other side and the other end thereof.

Fig. 3 is a vertical sectional view through a part of the mechanism of Fig. 2, as taken on the line 3—3 and shown on a scale smaller than that of Fig. 2.

Fig. 4 is a detail fragmentary view of a part of the drive mechanism of the improved capping head, as viewed in the direction of the arrows 4—4 on Fig. 3.

Fig. 5 is a vertical sectional view through the connecting rod of the mechanism, before mentioned, as taken on the line 5—5 and on a scale enlarged over that of Fig. 3.

Fig. 6 is a view on an enlarged scale of parts appearing in the upper portion of Fig. 3.

Fig. 7 is a horizontal sectional view through a part of the improved mechanism, as taken on the line 7—7 of Fig. 6, parts of the capping head lever being shown as broken away in order better to illustrate parts beneath the same.

Fig. 8 is an elevational detail view of the "split" end of the centering ring on a scale enlarged over that of Fig. 7 when viewed in the direction of the arrows 8—8 thereon.

Fig. 9 is a detail vertical sectional view through one of the split ends of the centering ring, as taken on the line 9—9 of Fig. 8.

Fig. 10 is a perspective view of the two coacting parts of the split centering ring appearing in Fig. 9.

Fig. 11 is a horizontal sectional view as taken on the line 11—11 of Fig. 6.

Fig. 12 is a view similar to Fig. 11, with certain of the parts appearing in a changed position.

Fig. 13 is a perspective view of one of a number of fingers mounted at the bottom of the cover-holding magazine for yieldably supporting the stack of caps therein.

Fig. 14 is a perspective view of one of a number of cap centering clips arranged on the inside of the bottom of the cover magazine operative to center each cover prior to its withdrawal from the magazine.

Fig. 15 is a view in elevation of the bottom end of the magazine and parts associated therewith, when viewed in the direction of the arrows 15—15 on Fig. 6.

Fig. 16 is a vertical detail sectional view through certain parts located at the bottom end of the cover-holding magazine, as taken on the line 16—16 and on a scale enlarged over that of Fig. 15.

Fig. 17 is a vertical detail sectional view through a part of the bottom end of the cover-holding magazine, as taken on the line 17—17 and on a scale enlarged over that of Fig. 15.

Fig. 18 is a horizontal sectional view through the bottom end of the magazine, as taken on the line 18—18 of Fig. 15.

Fig. 19 is a perspective view of the capping head embodied in the improved mechanism and which will be more fully described later.

Fig. 20 is a transverse vertical sectional view through the cap or cover applying head, as taken on the line 20—20 of Fig. 19.

Fig. 21 is a schematic or diagrammatic view illustrating the vacuum or suction line control to the capper head.

Fig. 22 is another view similar to that appearing in Fig. 21, when viewed in the direction of the arrows 22—22 on said Fig. 21, and Fig. 23 is a schematic view showing the vacuum pump, control valve and associated parts.

In describing the invention reference will be made to the specific type of container illustrated in the drawings and which is best shown in Figs. 1, 2 and 6. Such a container comprises a body 30 having a closed bottom 31 and an open top. The open top marginal portion of the body terminates in a "rolled" portion forming an annular external rim 32.

The cover comprises a disk portion 33 and an outer annular portion 34 united with the disk portion, the annular portion 34 terminating in a downwardly extending annular flange 35.

In covers of this style the inside diameter of the flange 35 is often actually smaller than the outside diameter of the external rim portion 32 of the container body. However, the "rolled" structure of the container rim 32 facilitates assembly, providing the container body and cover have been properly aligned prior to the final assembly operation and provided further they are in proper shape when the cover is being applied.

While reference has been made and will be made to the specific type of container illustrated in the drawings, it will be understood that this is by way of illustration and not by way of limitation.

*General description of operation*

Before explaining in detail the process and apparatus of the invention it is believed a general statement of the mode of operation will facilitate an understanding of the invention and afford a better appreciation of the problems involved, as well as the solutions which the invention attains.

It will be understood that the capping operation occurs in connection with the closing of the container after it has been filled or charged with the desired commodity which, for example, may be a food product such as cottage cheese, ice cream, dressing, etc. Since the process and apparatus for filling the containers form no part of the present invention they have not been illustrated.

However, referring to Fig. 1, containers A and A¹ have been filled and "capped," A² being positioned at the capping station ready to have the cover C² applied thereto.

CH represents the capping head as a whole, which carries a vacuum cup, described in detail later, for engagement with the outer surface of the cover disk portion 33, before mentioned.

A supply of covers is contained, as a stack, in the magazine M which, it will be noted, is arranged at an inclination. Means are provided for swinging the capping head CH upwardly, after it has released the cover C² during the capping operation. At the same time the capping head CH is partially inverted to present the vacuum cup carried thereby to the outer face of the disk portion of the lowest cover in the magazine M. At that time a vacuum obtains in the vacuum line to the vacuum cup so that upon engagement with the cover disk portion and upon return of the capping head to capping position a cover will be withdrawn from the magazine and partially inverted until it reaches the position shown in Fig. 1. At such time the cover is generally aligned with the upper rim of the underlying container body, to which it is to be applied.

However, at times the body and cover may not be properly aligned so that means CR are provided which function to effect alignment and also to correct certain deformations in container and cover which sometimes obtain and which, if not removed, would prevent assembly.

In addition to providing a vacuum which will function when the vacuum cup carried by the capping head transfers a cover from the magazine M to the position shown in Fig. 1, means are also provided to dissipate the vacuum and to apply positive pressure in order to cause release of the cover as it is being applied to the container body.

Referring to Fig. 1, it will be seen that the covers in the magazine M, while arranged in a stack, are irregularly nested. That is to say, some are disposed at one angle and others at a different angle. This is a condition which often obtains when a long stack of covers is placed in the magazine. In order that the vacuum cup may properly engage the cover to be removed, it is necessary to denest the covers and also to arrange the lowermost one so that the lower downwardly facing disk portion thereof will be substantially transverse to the axis of the vacuum cup when the latter is positioned to engage the disk portion 33 of the cover.

As a part of the denesting operation the lower covers in the magazine M are given a partial rotary or rocking motion within the magazine which tends to straighten the lowermost cover and to free it from undesirable interlocking relation with the adjacent superposed cover of the stack. The rocking or rotary motion is given to such covers of the stack of covers by the wiper mechanism W, best shown in Figs. 1, 11 and 12, which oscillates between the positions shown in Figs. 11 and 12.

As the vacuum cup of the capping head engages the lowermost cover of the stack in the magazine M it tends to move the stack upwardly. Undue upward movement is prevented by the engagement of a plurality of pins carried by mechanism P—P, which pins, at the proper time, engage the flange of that cover which is immediately above the lowermost cover, thereby preventing the stack from moving too far upwardly. This action also aids in the separation of the lowermost cover from the rest of the stack and also assists in the straightening of the lowermost cover so that it may be properly engaged by the vacuum cup carried by capping head CH.

Yielding means are also provided at the bottom of the stack of covers in the magazine M for supporting them against dropping and yet which permit the lowermost cover to be removed as the capping head moves away from the magazine M.

An important part of the process and apparatus is what is sometimes herein termed a centering ring CR which performs a number of important functions which will be described in detail later.

It will be understood that means, specifically a conveyor CV in the present structure, advances the containers in a step by step manner to and past the capping station, the conveyor remaining at rest periodically as successive containers arrive at the capping station.

Having thus given a general outline of the process and apparatus we shall proceed with a detailed description of the specific disclosed apparatus and process.

The general actuating mechanism

The capper mechanism as a whole is driven from a main shaft 50, rotatably supported in the frame 51 of the machine. Rotation is imparted to the shaft 50 by an electric motor, or other suitable power source, not shown. The shaft 50 drives a gear train comprising gears 53, 54, 55, 56 and 57 (best shown in Fig. 4) and which are rotatably mounted in the articulated link structure designated as a whole by numeral 58. The gear 53 is fixedly united to rotate with the main drive shaft 50, while the gear 57 is carried on shaft 59 which is rotatably mounted in the bar-like standard 60.

The standard 60 is slidably supported in brackets 61 and 62 which project from the frame 51 of the machine.

Vertical adjustment of the standard 60 and the parts carried thereby is possible by means of the threaded member 63 which is swiveled in the projection 64 carried by the lower end of the standard 60, the upper end of the member 63 operating in a threaded opening in the bracket 61. Handle 65 provides for convenient manipulation.

The upper end of standard 60 is bolted or otherwise suitably attached to a housing structure which, as a whole, bears the numeral 66 and is herein sometimes termed the main capper body frame. As is perhaps best shown in Fig. 1, the housing 66 comprises a horizontally disposed base portion 66ᴮ, spaced upright side flange portions 67—67 which, in turn, are cross-connected by an inclined plate-like part 68.

As a matter of convenience for descriptive purposes, the front will be considered to be that part which one sees when viewing the machine from the right hand side of Fig. 3 and the rear will be considered to be that part which one sees when looking toward the machine from the left hand side of Fig. 3. Also, for convenience of description, the right hand side of the machine will be considered to be the parts on the near side of the machine, as viewed in Fig. 1 and the left hand side those parts disposed upon the far side, as viewed in Fig. 1.

Fixed to the shaft 59 is a crank arm 70 pivotally connected at 71 to one end of a link member 72, shown in detail in Fig. 5, and later described in detail, the upper end of which is pivotally connected at 73 to what is termed herein a capper lever, bearing as a whole, the numeral 74.

The rear end of the capper lever 74 is pivotally mounted on a horizontally disposed shaft 75, the ends of which are supported in the spaced upstanding wall portions 67—67 of the main capper body frame 66.

It will be understood the main drive shaft 50 runs at constant speed and through the gear train 53 to 57, crank 70, and link 72 causes to-and-fro swinging movement of the capper lever 74, on its axis on shaft 75, between the full and dotted line positions shown in Fig. 6.

It will be helpful here to state that all of the motions which are positively imparted to the various levers, cams, etc. involved in the capping operation and which are carried by the main capper frame, result from the swinging movement of the capper lever 74.

The capper head and operation thereof

The capper head, as a whole, is best shown in Figs. 1 and 19. It comprises a body portion 80 rotatably mounted upon a shaft 81, which is carried by and fixed in the spaced outer portions 82 and 83 of capper lever 74. On the arm portion 84 of the body 80 is a lug 85 carrying a stud 86 on which a cam follower roller 87 is rotatably mounted.

Secured to the left hand side of the main capper body frame, and projecting forwardly therefrom, is a rigid arm 88 to which is fixed a cam plate 89 having a cam groove 90 on the inner exposed face thereof and in which the cam roller 87 rides.

It will be noted (see Fig. 6) that the cam groove 90 has a lower portion which is vertically disposed and which merges at the top into an arcuate portion which curves toward the front of the machine, finally terminating and opening at 91 through the upper part of the cam plate 89.

As the capper lever 74 swings upwardly the cam roller follower 87 moves through the cam groove 90, causing a rotation or inversion of the capper head CH. Further upward movement of capping lever 74 causes the roller 87 to engage cam gate lever 92 which is pivoted at 93 on a pivot carried by the arm 88, being the same arm that carries the cam plate 89.

The cam gate lever 92 is held down by a spring 94 which is fixed at its upper end to the outer end of lever 92 and at its lower end to a projection 95 fixed to cam plate 89.

When the cam follower reaches lever 92 it continues to pivot about the center on which capper lever 74 pivots until the capper head stops pivoting around capper lever 74 by virtue of the stop screw 96 bearing against capper lever 74.

Mounted on the capper head body portion 80 is a circular plate 97, the under portion 98 of which is formed to seat in the open top of the specific cover for which it is designed to coact.

Secured in the plate 97, by means of the cup adapter 100, is a vacuum cup 101 having a rim portion 102 which defines a chamber 103. The vacuum cup is made of yieldable material, such as rubber or other suitable elastomer.

A tubular line 104 leads to the chamber 103 of the vacuum cup conduit, terminating in a restriction 105, the purpose of which will be explained later in connection with the functioning of the vacuum system.

From the foregoing it will be seen that the travel of the capper head at the upper portion of its stroke is arcular and nearly tangent to the center line of the cover-holding magazine M. As the capper lever 74 is swung downwardly, the cam roller 87 engages the cam and moving through the cam groove 90 causes the capper head to rotate until near the lower part of its travel, it is traveling in substantially a straight line, thereby presenting the cover in such a position that it can be properly seated or united with the upper rim portion of the container.

Due to the long radius of the arc on which the capper lever 74 swings and to the manner in which the capper head operates it will be understood that the capper head traverses what is substantially a straight line as it moves in the vicinity of the magazine M whilst in the act of removing covers from the magazine. Such action facilitates proper removal of the covers from the magazine.

As before explained, it is essential that the container or cup and its cover be properly aligned at the time they are to be united. It is also essential to the rapid and efficient operation of the capping action that both the cup and its cover be presented to each other substantially in undeformed condition, i.e. structurally and dimensionally in the form and shape intended. The mechanism for performing these functions will be described later under the heading of Centering Ring Structure and Operation. However, it is thought best first to describe the manner in which the covers are positioned in the magazine and removed therefrom.

*Cover magazine and process of removing covers therefrom*

Only the lower portion of the cover holding magazine M is shown. It will be understood that it may be of any suitable length. In one practical application the magazine is of such length as to be able to accommodate a stack of covers of the order of thirty inches in length, thereby holding a large number of covers.

In order to facilitate placement of a stack of covers in the magazine, the magazine M, which comprises a generally tubular member 110, is provided with a 180° slot 114 at the front thereof, which extends from the top to the bottom. The bottom of the member 110 is fitted into a casting 111, the lower part of which terminates in a ring-like portion 112. The casting 111 includes a bracket portion 113 which, in turn, is fixed to the wall 68 of the main capper body frame.

The slot 114 is partially closed by a door member 115, which is hinged at 116 so that it may swing from the closed position, as shown by the full lines in Figs. 11 and 12, to the open position shown in dotted lines in Fig. 11. To facilitate opening and closing there is provided a spring latch member 117, one end of which is fixed to the outer face of the door and the free end of which is designed to snap into closing engagement with the flange portion 117ᵃ that defines one side of the slot 114.

When the door is swung to open position it is possible conveniently to insert a long stack of covers into the magazine through the open front. This is usually done whilst there are still a few covers remaining in the lower part of the magazine.

A link 120 (see Figs. 2, 3, 6, 11 and 12) is pivotally connected at its lower end 121 to the upstanding arm portion 122 of the capper lever 74 and at its upper end to a vertical spherical pivot member 123, the latter being carried by one end 124 of a lever 125. The lever 125 rocks about a stud shaft 126 which is secured to and upstands from the wall 68 of the main capper frame.

The lever 125 includes a second arm portion 127, to the outer end of which is fixed a cam plate 128, terminating in a cam edge portion 129.

130 and 131 (see Figs. 11 and 12) are two levers which pivot about pivots 132 and 133 respectively, that are fixed in and upstand from the bracket that supports magazine M. The levers 130 and 131 include outer arm portions 134 and 135 respectively and inner arm portions 136 and 137 respectively, the latter being united at 138 by means of a joint which permits articulate movement back and forth between the full line positions shown in Figs. 11 and 12. This motion is imparted by the cam surface 129 through its engagement with the roller 140, that is rotatably carried by the arm portion 135 of lever 131.

A spring 141ˣ extends between and has its end portions fixed to the levers 130 and 131 in positions which cause the spring to tend to return the levers to the full line position shown in Fig. 11. This action also serves constantly to maintain the roller 140 in contact with the cam surface 129. Hence swinging movement of the cam member 128 in one direction positively swings lever 131 on its pivot lever in turn through the joint 138, imparting swinging movement to the other lever 130.

Fixed to the outer end edges of the arms of levers 130 and 131 are forwardly extending bars 141 and 142 respectively.

Each of said bars carries, near its outer end, a pair of spring-loaded pins 143. Since all pins are alike, a description of one will suffice for all. The pin 143 comprises a shank portion 144 terminating in a tapered head portion 145. The outer end of the shank portion 144 is fixed to a nut 146. A spring 147 is positioned between the pointed head 145 and a shoulder 148. The structure is such that when the point of the head portion 145 engages the flange portion of a cover in the magazine the pin will yield after the imposition of pressure of a predetermined magnitude, which however will be sufficient to hold the engaged cover against undue movement longitudinally of the magazine M.

From the foregoing explanation it will be seen that as the bars 141 and 142 swing from the full line position shown in Fig. 11 to that shown in Fig. 12, the pins 143 will be forced inwardly a sufficient distance to cause engagement with the flange portion of the adjacent cover. The position of the pins 143 is such that it will engage the flange portion of that cover which is next to the lowest in the magazine at the time the structural parts are positioned as in Fig. 12.

It should be here stated that the pins 143 are in their innermost position when the capper head has arrived nearly at its uppermost position and are in their outer position when the capper head is partway down.

As previously explained, the covers in the magazine M have a tendency to become nested or partially nested at various angles therein, as clearly appears in Fig. 1. Hence, they are not all always centered in the magazine nor are they all interengaged to the same extent. This condition has caused considerable difficulty in the past and has been one of the factors which has prevented the efficient and rapid removal of covers from magazines in prior devices. The attempt has been made to prevent such random disposition of the covers by making a magazine tube in which the covers fitted tightly. This, however, developed other objectionable actions.

In order to overcome these difficulties the tube of the magazine in the instant machine has deliberately been made oversize, i.e. with an internal diameter larger than the external diameter of the largest part of the cover. While this construction might seem to be disadvantageous because it permits the covers to become angularly disposed in actual practice, it has been found that the covers do not bind or lock in the magazine. That is to say as the lowermost cover is removed from the stack the remaining covers will move down if the lowermost covers in the stack are subjected to a partial rotation within the magazine.

Such action also assists in the denesting of the covers at the lower end of the stack.

*The process and means for imparting rotary motion to covers*

The mechanism for performing this function bears the general reference character W. The construction and operation thereof are best depicted in Figs. 1, 11 and 12. The mechanism comprises a wiper finger 150 which is fixed to the end of an arm 151, the latter being secured to the free end of a lever 152. The other end of lever 152 is pivotally mounted on the pivot 126 so that it can swing with lever 125. Lever 152 is driven in one direction i.e. from that shown in Fig. 12 to that shown in Fig. 11 through the medium of the spring assembly 153 and positively in the other direction i.e. from the position shown in Fig. 11 to that of Fig. 12 by the lug 154 which is fixed to and upstands from the arm portion 124 of lever 125.

Secured to the finger 150 and extending therefrom, is a spring arm 155. As the finger 150 moves in a counter-clockwise direction i.e. from that shown in Fig. 12, toward that shown in Fig. 11, the inner face portion 156, which is composed of friction material, engages the flange portions of the adjacent covers and imparts thereto a partial rotation. When the part 155 reaches the roller 157, which is rotatably carried in the member 158 that is fixed to the magazine, the finger moves away from contact with the covers, thereby permitting them to drop freely, as is necessary to continue feeding the stack downwardly as covers are successively removed by the capper head.

The finger in returning from the position shown in Fig. 11 to that of Fig. 12, again engages the covers in the lower part of the magazine, thereby imparting partial rotary motion in a clockwise direction.

It should be stated that the timing of the mechanism is such that the wiper finger 150 is moved away from contact with the covers as the capper head reaches its lowest position.

This partial rotation or jogging action of the covers by the wiping action of the finger 150 causes the covers to denest. Without such action a constant, uninterrupted, sure-feeding of single covers cannot be assured. The tendency of the covers is to nest just enough and with such tenacity that they will either "jam" in the magazine or two covers, instead of one, will be withdrawn by the capper head as it moves away from the magazine in a cover-removing operation.

Means for centering covers in magazine

As before explained, the internal diameter of the magazine is somewhat larger than the external diameter of the cover. In one practical arrangement where the external diameter of the cover is substantially 3¾" the internal diameter of the magazine is ¼" larger. As can be seen clearly in Fig. 1, the covers are not centered in the container, but are arranged somewhat irregularly. However, in order that the covers may be properly centered on the capping head at the time the cover is withdrawn, the lowermost cover should always be located in some definite predetermined position. As here shown, this is done by positively locating each lowermost cover in the magazine as successive covers reach that position. This is effected by means of three wedges 160 spaced about 90° apart, the rear inner face of the magazine serving as the fourth centering point. In this way, while the cover will be centered slightly rearwardly of the center of the magazine, it will always be brought to that location, the capper head mechanism being operative to engage the cover when so located.

These wedges may be of the construction shown in Figs. 14 and 17. As there shown the wedge is formed of a generally L-shaped piece of metal, the inclined portion 161 being positioned on the inner face of the bottom casting of the magazine and the base portion 162 engaging the bottom of the casting. The portion 162 is slotted at 163 so that it may be adjustably held in position by means of the tap screw 164. In this way adjustment can be made as may be necessary, to assure proper location of covers which vary in size or to compensate for variations in the actions or functioning of certain other parts of the mechanism.

The stack of covers in the magazine M is supported against dropping by means of four tapered lugs 170, the construction of which is best shown in Figs. 15 and 16. Since all are alike a description of one will suffice for all. The lug 170 is fixed to the lower end of a spring member 171, the upper end of which is fixed to the outer face of the lower part of the magazine. Normally the rim of the lowermost cover of the stack rests upon the upper downwardly and inwardly inclined face 172, as indicated by the fractional part of a cover, as shown in Fig. 16. However, when the vacuum cup, carried by the capper head, engages the cover disk, sufficient grip is provided that on the capper head moving downwardly the engaged cover follows with it, thereby pressing the lugs 170 outwardly in passing, to the position shown in dotted lines in Fig. 16, after which the lugs 170 spring back into the full line position ready again to support the covers remaining in the magazine. Before proceeding to a detailed description of the actual joining of the cover with the cup or container body, it is believed it will be helpful first to describe the vacuum system and its operation.

The vacuum system and process

As before explained, the capping head CH includes a member 97 which carries a vacuum cup 101 having a chamber 103 defined by the peripheral edge portion 102 (see Fig. 20).

Referring first to schematic view (Fig. 23), 180 is a four-way valve and 181 is a vacuum pump driven by motor 182. Two conduits or lines 183 and 184 connect the vacuum pump with the four-way valve 180.

Another conduit 185 leads from the four-way valve to the vacuum cup of the capper head. A fourth line 186 leads to atmosphere. The means for actuating the four-way valve is shown in Figs. 21 and 22. However, before describing the same in detail, it will be helpful to state the arrangement in such that a vacuum is drawn in line 185, which leads to the vacuum cup of the capper head, at all times, except when the vacuum cup approaches the capping position, at which time the four-way valve is actuated so that air under pressure is forced through line 185. Hence the cover which has been held in place by the vacuum obtaining in the vacuum cup chamber is broken and the cover thereby released.

For purposes of illustration we may assume that a vacuum is drawn in line 185 whenever the movable element of four-way valve 180 is positioned to connect lines 185 and 183, at which time lines 184 would be connected to discharge to atmosphere through line 186.

Referring particularly to Figs. 21 and 22, 190 is a shaft, to which is fixed for rotation therewith a member 191 having a cam surface 192. The shaft 190 makes one revolution per capping operation.

The movable element of the four-way valve 180 is spring-loaded by spring 193 to maintain the interconnections, as before described. In order to reverse these connections it is necessary to move the valve element downwardly, as viewed in Figs. 21 and 22. For this purpose there is provided a lever 194 which is pivoted at 195 to a fixed part of the frame and to which the casing of the four-way valve 180 is also fixed. The lever 194 carries a roller 196 which rides on the periphery of the cam that rotates with shaft 190. Once each revolution of shaft cam surface portion 192 engages the roller depressing lever 194. This shifts the valve movable element axially of the casing, thereby breaking the vacuum in line 185 and supplying the same with air under pressure, as before described.

Line 185 leads to junction box 200, fixed to the main capper frame 66. A line 201 leads from the junction box 200 to the fitting 202, a flexible line 203 leading to the fitting 104 of the capper head CH. Interposed in the line 201 is a filter 204.

The duct in line 185 is of substantial size. Since the pump is connected to draw a vacuum in this line, all the time, except when the cover is being released for application to the container, a vacuum pump of relatively large capacity would be required if the duct terminated in the vacuum cup where not restricted. Hence the outlet there terminates in a restriction 105.

After the cover has been released from the vacuum cup, and while the capper head is returning to cover pick-up position, the action of the vacuum pump will be sufficient to evacuate the line 185 to a considerable extent by the time the vacuum cup engages the cover to be removed. Thereupon the final vacuum can quickly be established in the vacuum cup chamber to the extent necessary to effect the desired gripping action on the cover.

The centering ring structure and operation

The centering ring CR and its action are perhaps best shown in Figs. 1, 3, 6, 7, 8, 9 and 10. Fig. 10 is a perspective view of the centering ring disconnected from the operating levers and other parts.

The centering ring CR is supported on the forward end of a lever 210, the latter pivoting at 75, being the point on which the main capping lever 74 also pivots. The lever 210 carries an upwardly extending bracket portion 211, in the end of which is positioned a screw 212ᵃ (see Fig. 6). When, in its upward swinging movement the upper surface of the main capper lever 74 (in the vicinity of 213ᵃ) engages the head 214ᵃ of said screw, the lever 210 is also swung upwardly. When the capping lever 74 approaches its lowest position the centering ring supporting lever 210 engages the head of screw 214 which is fixed in and projects upwardly from the portion 66ᴮ of the main capper body frame.

It is necessary that the centering ring CR, which is carried by the lever 210, be stopped at a definite point during downward travel while the capping head CH, which carries the cover to be affixed, continues its downward motion, as necessary to apply the cover to the cup or container.

The centering ring CR comprises two main parts 212 and 213, the former being fixed to the support lever 210 and the latter being pivotally secured thereto on the vertical pivot 214 of the support lever 210. The two halves 212 and 213 are held together by a relatively light spring 214ˣ, the ends of which are attached to pins 215 and 216 that are fixed to the two parts of the centering ring.

In order to maintain the two parts of the centering ring in proper alignment part 213 is provided with a grooved projection 217 into which a tongue portion 218, carried by the part 212 slidably interfits.

Mounted on the main capper lever 74 is a shoulder screw 220, on which is a link 221 containing an elongated slot 222. As the capper lever 74 is raised link 221 is raised therewith until the bottom of the slot makes contact with the pin 223 that is carried by one arm 224 of plate lever 225 that is pivoted at 226 to the centering ring supporting bracket 210. To the other arm 227 there is pivoted at 228 one end of an adjustable link 229, the other end being connected to a vertically disposed pivot pin 230 operatively carried by the arm portion 213ᵃ of part 213 of the centering ring.

When the pin 223 engages the bottom of the slot 222 further movement of the capping lever causes rocking movement of lever 225, thereby pulling link 229 rearwardly and resulting in swinging part 213 of the centering ring from the full line position shown in Fig. 7 to the dotted line position.

The ring-like halves 230 and 231 of the centering ring are of like cross section. The cross-sectional shape is best shown in Fig. 9. Thus, there is a central flat band portion 232 and upper and lower inclined portions 233 and 234 respectively. As can be seen from Fig. 10 the two parts of the centering ring thus constitute a substantially complete circle when the parts are drawn together by the spring 214.

Assembly of the cover and container or cup

From the foregoing description it will be understood the capping head will periodically present a cover to and immediately over the centering ring CR. Also, that prior thereto the conveyor CV will have positioned a cup or container under the centering ring and prior to the time the centering ring has moved to its lowermost position.

Should the container at that time be slightly off-center with respect to the center of the centering ring, the lower inclined surface of the centering ring, by engagement with the rim of the cup, will act to center the cup. Also should the cup be somewhat out of round or deformed, said lower annular beveled or inclined band surface portion will correct the deformation, thereby shaping the rim portion of the cup properly to receive the flange portion of the cover.

So, also, should the cover be off-center with respect to the center of the centering ring, the upper annular inclined portion will center the cover on the centering ring.

As in the case of the rim of the cup, should the flange of the cover be somewhat deformed or out of round, the defect will be corrected by the "camming" action of the inclined upper surface portion of the centering ring as the cover is forced downwardly into assembled position with the cup or container.

As the cover is moved downwardly under the action of the capper head, the flange portion of the cover will force the movable part of the centering ring to slightly open position, thus allowing sufficient space for the flange of the cover to enter into encircling relationship to the rim of the cup or container, as is illustrated in Figs. 3 and 6.

As the capping head CH leaves the cover and starts upwardly, the centering ring will be opened by the mechanism, before described. The centering ring will remain open thereafter until again on the downward movement, the centering ring support arm has been allowed to drop down against its stop, at which time further downward movement of the main capper lever will allow the centering ring spring to close the ring and pull into final position the following cup, which the conveyor will, by that time, have moved to substantially capping position and in the manner above described.

Further features and remarks

General reference has heretofore been made to the link 72 which actuates the capping lever 74. The structure of this link is shown in detail in Fig. 5. As will be seen, this is a spring link. The arrangement is such that it functions as a solid link when subjected to normal loads. However, should a condition develop in which an abnormally heavy load is imposed thereon, it will yield, thereby preventing damage to the associated parts of the machine. The arrangement is also such that it will automatically change in length in either direction, depending upon the direction of the applied excessive load.

Link 72 comprises two tubular parts 250 and 251 which are united by welding. A spring 252 is arranged between slidable elements 253 and 254. Extending through the slidable elements is a rod 255 on one end of which is a head 256. On the outer side of member 254 is a nut 257. An extension of rod 255 carries an eye 258. A similar eye 259 is fixed to the tubular portion 251.

From the foregoing description it can be seen that the link 72 can function as described.

As best shown in Fig. 3, a rod 260 is fastened at its upper end to frame 66 and at its lower end to the bracket structure 261, the latter being connected to move with the stand 69. Rod 260 serves as a brace.

Spring 72ᵃ serves yieldingly to urge lever 210 downwardly against the stop screw 214, yet permitting the necessary swinging movement of lever 210.

The purpose of set screw 96ᵃ (see Fig. 6) is to limit the swinging movement of the capping head CH by engaging lever 74. By adjusting screw 96ᵃ, as necessary, it is possible to present the capping head and the cover carried thereby squarely to the container so that the cover can be assembled with the container.

Reference has previously been made to the ability of the mechanism to assemble covers and containers where either thereof reaches the capping station somewhat deformed. It should also be mentioned that the mechanism enables the assembly of a cover having a flange, the inside diameter of which is somewhat less than the outside diameter of the rim portion of the container. In the specific container disclosed in this application this is possible because of the "rolled" rim of the container. As long as the cover flange engages the outer and downwardly curving rim top of the container the cover flange will be deflected outwardly and find its way into position between the inner surface of the centering ring CR and the outer adjacent face portion of the container.

A similar action would obtain were the bottom edge of the cover flange either "rolled" or flared outwardly. In other words, a sort of "camming" action obtains which forces the cover flange into position in the centering ring in a surrounding relation with respect to the container.

Reference has previously been made to the fact that the cover magazine M is disposed in an inclined position with the cover-removing end at the bottom. As stated, arranging at an inclination also causes the cover to tend to move downwardly, due to the force of gravity. From the disclosure it is also obvious that annular flange portions of the covers engage the interior wall of the magazine and move toward the cover removal end substantially along the lowest line of the inside surface of the magazine that is parallel to its central longitudinal axis.

We claim:

1. The process of applying a cover having a sheet portion and an annular flange portion to a container having an annular wall portion terminating in an open top and in such manner that the cover flange fits around the outer top marginal part of the container, comprising locating the container with the open top up and in approximate position for capping, providing a split ring, the opening of which includes an annular surface that tapers upwardly and inwardly from the lower face of the ring, an annular surface that tapers downwardly and inwardly from the upper face of the ring, and an intermediate vertical substantially untapered annular surface, lowering the split ring in open condition so that upper marginal rim portion of the container telescopes into the ring opening through said lower tapered part until the upper marginal rim portion of the container is, at least in part, within the confines of the opening defined by said intermediate annular surface of the ring, closing the split ring thereby locating the container in correct position for capping, if not initially sufficiently accurately so placed, pressing the cover downwardly so that the flange thereof passes through the top tapered opening in the split ring until the flange is positioned around the upper outer marginal portion of the container, thereby opening the split ring sufficiently to accommodate the cover flange between the top outer marginal portion of the container and the adjacent intermediate ring portion, opening the split ring, and then raising the split ring enough to free the container entirely from the split ring.

2. The process set forth in claim 1 in which the tapered openings in the split ring and the intermediate annular portion are brought into contact with and conform such portions of the cover and container as are out of shape.

3. The process set forth in claim 1 in which the upper marginal portion of the container includes a rolled rim disposed around the wall of the container, and in bringing the cover flange into contact with the top portion of the rolled rim whereby the flange of the cover is guided outwardly into surrounding relationship with respect to the rolled rim.

4. The process set forth in claim 1 wherein an elastic vacuum cup is used to support and press the cover into position around the top marginal portion of the container.

5. In a machine for applying covers to containers having an open top defined by an annular marginal portion, the combination of means for moving such a container to a capping position, means for moving a cover to said capping position, means for engaging and centering the cover relative to said capping position, means for engaging and centering the cover relative to the container, said last mentioned means being formed and adapted to conform portions of the cover to portions of the centering means, should the engaged cover portions be at variance therewith, said means for centering container including a split ring comprising a plurality of segments, at least one of which is pivotally mounted for swinging movement in the plane of the ring to and from another segment, yieldable means for drawing said segments together, and other means for swinging said pivotally mounted segment to open position after the application of the cover to the container.

6. In a machine for applying covers to containers having an open top defined by an annular marginal portion, the combination of means for moving such a container to a capping position, means for moving a cover to said capping position, means for engaging and centering the cover relative to the container, said last mentioned means being formed and adapted to conform portions of the cover to portions of the centering means, should the engaged cover portions be at variance therewith, said means for centering the container and cover including a split ring comprising a plurality of segments, at least one of which is pivotally mounted for swinging movement in the plane of the ring to and from another segment, yieldable means for drawing said segments together, other means for swinging said pivotally mounted segment to open position after the application of the cover to the container, and means for maintaining said segments in operative alignment during the relative-to-and-fro swinging movements of the segments.

References Cited in the file of this patent

UNITED STATES PATENTS

| | | |
|---|---|---|
| 1,550,741 | Pinkerton | Aug. 25, 1925 |
| 1,919,060 | Harder | July 18, 1933 |
| 1,929,275 | Eudaly et al. | Oct. 3, 1933 |
| 1,979,089 | Adams | Oct. 30, 1934 |
| 2,252,201 | Price | Aug. 12, 1941 |
| 2,349,523 | Sonnenberg | May 23, 1944 |
| 2,390,298 | Glassner | Dec. 4, 1945 |